United States Patent [19]
Mao

[11] Patent Number: 6,166,373
[45] Date of Patent: Dec. 26, 2000

[54] FOCAL PLANE SCANNER WITH RECIPROCATING SPATIAL WINDOW

[75] Inventor: Chengye Mao, Slidell, La.

[73] Assignee: The Institute for Technology Development, Stennis Space Center, Miss.

[21] Appl. No.: 09/120,092

[22] Filed: Jul. 21, 1998

[51] Int. Cl.[7] ..................................... H01J 3/14
[52] U.S. Cl. .......................... 250/226; 250/234; 356/310
[58] Field of Search ................................ 250/226, 208.1, 250/234, 201.2, 201.4, 201.8; 356/310, 326, 328, 375, 376

[56] References Cited

U.S. PATENT DOCUMENTS

| | | | |
|---|---|---|---|
| 2,931,858 | 4/1960 | Hammond et al. | 178/6.7 |
| 3,078,341 | 2/1963 | Willey | 178/6.8 |
| 4,231,062 | 10/1980 | Stewich | 358/109 |
| 4,404,592 | 9/1983 | Pepin et al. | 358/125 |
| 4,631,581 | 12/1986 | Carlsson | 358/93 |
| 4,660,975 | 4/1987 | Aughton | 356/308 |
| 4,707,735 | 11/1987 | Busby | 358/108 |
| 5,112,125 | 5/1992 | Neumann | 356/73 |
| 5,448,399 | 9/1995 | Park et al. | 359/372 |
| 5,471,056 | 11/1995 | Prelat | 250/253 |
| 5,481,479 | 1/1996 | Wight et al. | 364/525 |
| 5,592,291 | 1/1997 | Iida | 356/326 |
| 5,706,083 | 1/1998 | Iida et al. | 356/328 |
| 5,751,420 | 5/1998 | Iida et al. | 356/328 |

OTHER PUBLICATIONS

Chengye Mao, Mike Seal, & Gerald Heitschmidt, *Airborne Hyperspectral Image Acquistion with Digital CCD Video Camera*, 16th Biennial Workshop on Videography & Color Photography in Resource Assessment (1997).

Xiuhong Sun, James Barker & Richard Hordon, *A Spectrally–Filtered Airborne Video System and Its Imagry*, 15th Biennial Workshop on Videography & Color Photography in Resource Assessment (1995).

Optical Coating Laboratory, Inc., Spectraband Linear Variable Filters, *Stock Products Catalog*, vol. 5. at 22–23 (1994).

Edmund Scientific,*Video Relay Lens Primer*, at 163.

*Primary Examiner*—Seungsook Ham
*Assistant Examiner*—Kevin Pyo
*Attorney, Agent, or Firm*—Walker, McKenzie & Walker, P.C.

[57] ABSTRACT

A focal plane scanner having a front objective lens, a spatial window for selectively passing a portion of the image therethrough, and a CCD array for receiving the passed portion of the image. All embodiments have a common feature whereby the spatial window and CCD array are mounted for simultaneous relative reciprocating movement with respect to the front objective lens, and the spatial window is mounted within the focal plane of the front objective. In a first embodiment, the spatial window is a slit and the CCD array is one-dimensional, and successive rows of the image in the focal plane of the front objective lens are passed to the CCD array by an image relay lens interposed between the slit and the CCD array. In a second embodiment, the spatial window is a slit, the CCD array is two-dimensional, and a prism-grating-prism optical spectrometer is interposed between the slit and the CCD array so as to cause the scanned row to be split into a plurality of spectral separations onto the CCD array. In a third embodiment, the CCD array is two-dimensional and the spatial window is a rectangular linear variable filter ("LVF") window, so as to cause the scanned rows impinging on the LVF to be bandpass filtered into spectral components onto the CCD array through an image relay lens interposed between the LVF and the CCD array.

15 Claims, 5 Drawing Sheets

SLIT MOVEMENT
IN FOCAL PLANE

LINEAR VARIABLE FILTER

LVF SPECTRAL PERFORMANCE

HYPER-SPECTRAL
SCANNED IMAGE

HYPER-SPECTRAL
SCANNED IMAGE

FOCAL PLANE SCANNER WITH RECIPROCATING SPATIAL WINDOW

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Research Grant No. NAG13-45 awarded by the National Aeronautics and Space Administration ("NASA").

CROSS REFERENCE TO RELATED APPLICATIONS

Not applicable

REFERENCE TO A "MICROFICHE APPENDIX"

Not applicable

BACKGROUND OF THE INVENTION

1. Field of the Invention

The present invention relates, in general, to image scanning, and in particular, to production of an electronic version of a scanned optical image.

2. Description of the Prior Art

It is often desired to scan an image of a target and then convert that image into an electrical signal for subsequent processing and viewing. Airborne scanners are well-known in which a slit is placed in front of a charge-coupled device ("CCD") array in a camera and the moving aircraft then sweeps (scans) the slit past the ground-based image target in a so-called "push-broom" mode, thereby causing the large ground-based image to be scanned as the aircraft flies over the ground. Such scanners have the disadvantage that the airborne scanner platform must move with respect to the target in order to accomplish the scanning.

Other image scanning devices, such as flatbed scanners or drum scanners, are known in which the target image is moved past a scanning head so that the image can pass through optics and into a camera and/or onto a CCD array.

In all such prior art devices, either the (one-dimensional or two-dimensional) CCD array must be large enough to receive the entire image at once or else the scanning process must move the target relative to the scanner so that the entire image can be scanned, and, in all such known devices in which the target moves relative to the scanner, the CCD array remains fixed (non-moving) with respect to the front objective lens of the scanner.

It is also desirable to be able to obtain a spectral representation or imaging spectrograph of the frequency components of an image so that the spectral representation may be further processed to reveal information hidden in the frequency components of the image. For example, in the paper entitled "Airborne Hyperspectral Image Acquisition with Digital CCD Video Camera", Chengye Mao, Mike Seal, and Gerald Heitschmidt describe an airborne scanning system in which a linear variable filter ("LVF") is placed at the focal plane of a front objective lens, and, as an aircraft transports the scanner over the groundbased target, the linear variable filter separates frequency components of the image that passes by the front objective lens onto a CCD array within a camera. Unlike the present invention, the linear variable filter and CCD array are fixed with respect to the front objective lens, and the scanner must reside on a mobile platform and move past the target image in order to accomplish the scanning of the image.

It is therefore desirable to have an improved image scanner that need not reside on a mobile platform that moves relative to a target image in order to accomplish scanning of that target image, and it is further desirable that such an improved image scanner provide an imaging spectrograph of the scanned image.

BRIEF SUMMARY OF THE INVENTION

The present invention is a focal plane scanner having a front objective lens, a spatial window for selectively passing a portion of the image therethrough, and image sampling array means, such as a charge coupled device ("CCD") array, for receiving the passed portion of the image. Three embodiments of the invention are described, and the essential feature common to all three embodiments is that the spatial window and CCD array are mounted for simultaneous relative reciprocating movement with respect to the front objective lens, with the spatial window being mounted within the focal plane of the front objective lens. In a first embodiment of the present invention, the spatial window is a slit and the CCD array is one-dimensional, and, as the slit moves within the focal plane of the front objective lens, successive rows of the image in the focal plane of the front objective lens are passed to the CCD array by an image relay lens interposed between the slit and the CCD array. In a second embodiment of the present invention, the spatial window is a slit, the CCD array is two-dimensional, and a prism-grating-prism ("PGP") optical spectrometer is interposed between the slit and the CCD array so as to cause the scanned row to be split into a plurality of spectral separations onto the CCD array, with spectral components for each point in the scanned row being separated onto the respective CCD columns for that point. In a third embodiment of the present invention, the CCD array is two-dimensional and the spatial window is a rectangular linear variable filter ("LVF") window, so as to cause the scanned rows impinging on the LVF to be bandpass filtered into spectral components onto the CCD array through an image relay lens interposed between the LVF and the CCD array.

It is an object of the present invention to provide an improved image scanner that need not reside on a mobile platform that must move relative to a target image in order to accomplish scanning of that target image. It is further desirable that some embodiments of such an improved image scanner provide an imaging spectrograph of the scanned image.

DETAILED DESCRIPTION OF THE INVENTION

Figure 1:
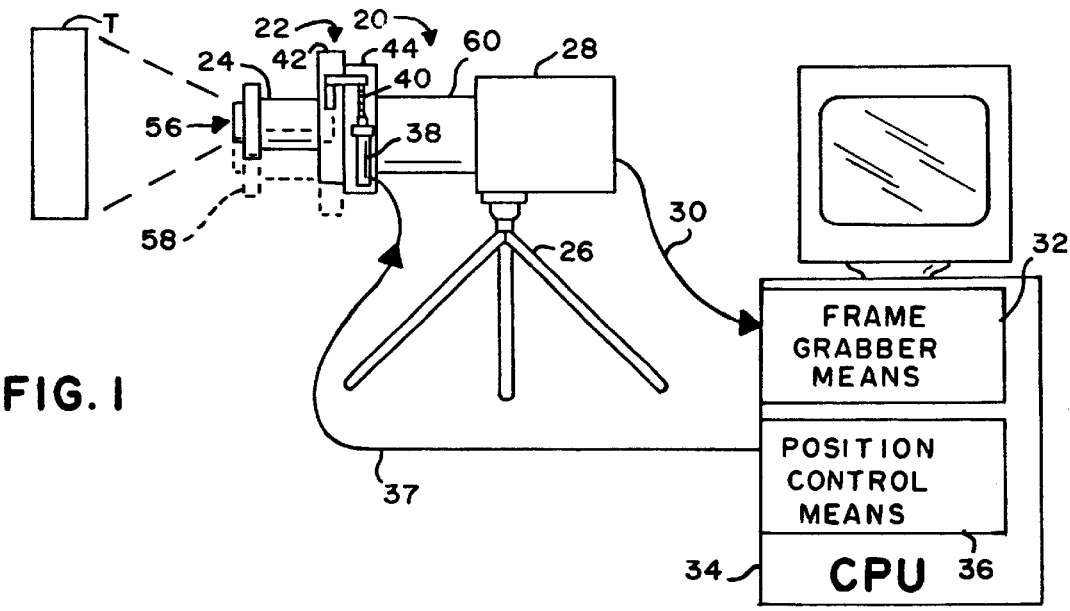
FIG. 1 is a schematic view showing the general structure of all embodiments of the present invention.

Referring to FIG. 1, all embodiments of the focal plane scanner 20 of the present invention are seen to comprise a translation stage mounting means 22 for mounting a spatial window, hereinafter described, for reciprocating movement within the focal plane of a well-known first optical objective lens means 24, so that the spatial window moves relative to the first objective lens means 24 and within the focal plane. First optical objective lens means 24 preferably is a model Cinegon 1.4/8 mm lens assembly part number 21-023340, having characteristics of near infrared rectification and made by Schneider Optics, Inc., having an address of 285 Oser Ave., Hauppauge, N.Y. 11788.

The focal plane scanner 20 may be mounted as on a tripod 26 in the proximity of a target T, and a scanned image of target T is viewed by a well-known CCD camera means 28 that translates the image into electrical signals and then transmits the scanned image along an electrical video cable 30 to a well-known "frame grabber" means 32 within a well-known computer 34, which then stores the scanned and captured image into a memory or onto a disk for subsequent viewing and further processing. Frame grabber means 32 preferably is a model SensiCam PCI Interface Board computer interface made by The Cooke Corporation, Ltd., having an address of 600 Main Street, P.O. Box 888, Tanawanda, N.Y. 14150-0888, and receives the electrical video signals from CCD camera means 28 and then stores the received signals into a memory for access by computer 34.

Computer 34 also controls, using a well-known interface logic board 36 operating over an electrical cable 37, a well-known servo motor 38 mounted to translation stage mounting means 22 so that, as the shaft 40 of servo motor 38 is caused to turn under the direction and control of interface logic board 36, the front portion 42 of translation stage mounting means 22 is caused to reciprocatingly move relative to the rear portion 44 of translation stage mounting means 22. The position control afforded by interface logic board 36 is preferably provided by a well-known interface logic board such as the model MM2000-OPT/01-08 850f computer interface made by Newport Corporation, having an address of 1791 Deere Avenue, Irvine, Calif. 92606.

Figure 12:
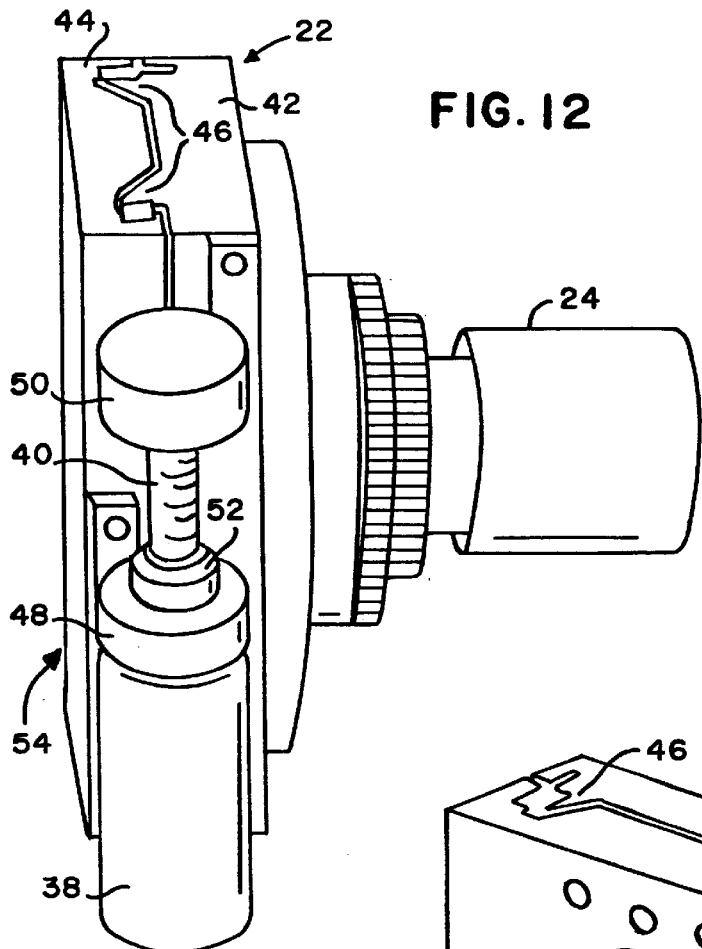
FIG. 12 is a side perspective view of the translation stage mounting means for all embodiments that provides reciprocating relative movement, within the focal plane of the image, of the spatial window with respect to the first objective lens.
Figure 13:
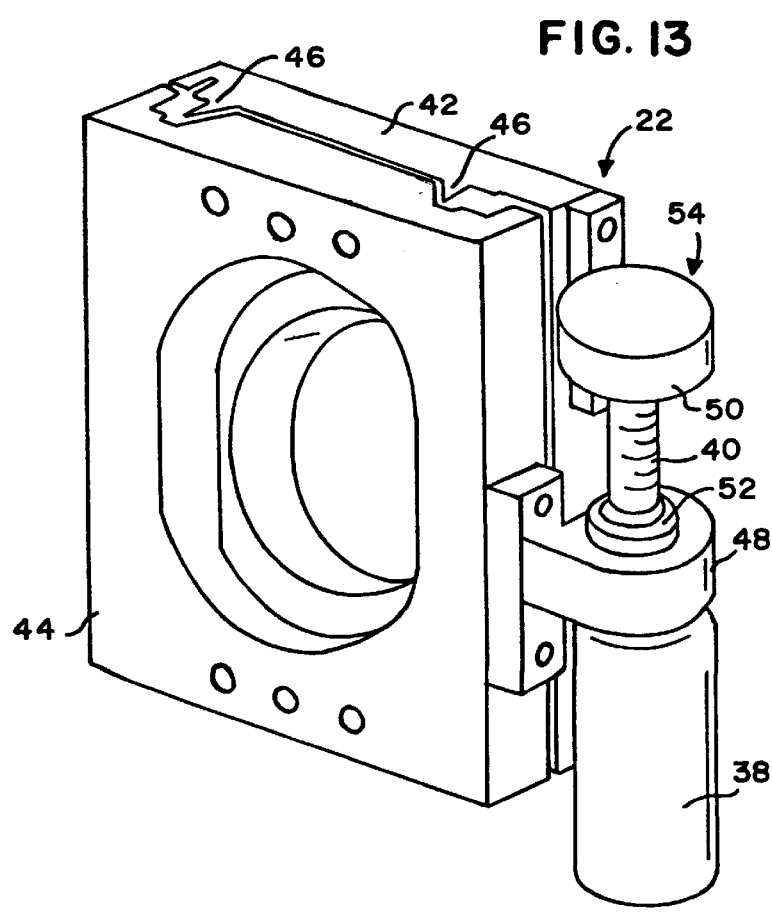
FIG. 13 is a rear perspective view of the translation stage mounting means for all embodiments that provides reciprocating relative movement, within the focal plane of the image, of the spatial window with respect to the first objective lens.
Figure 14:
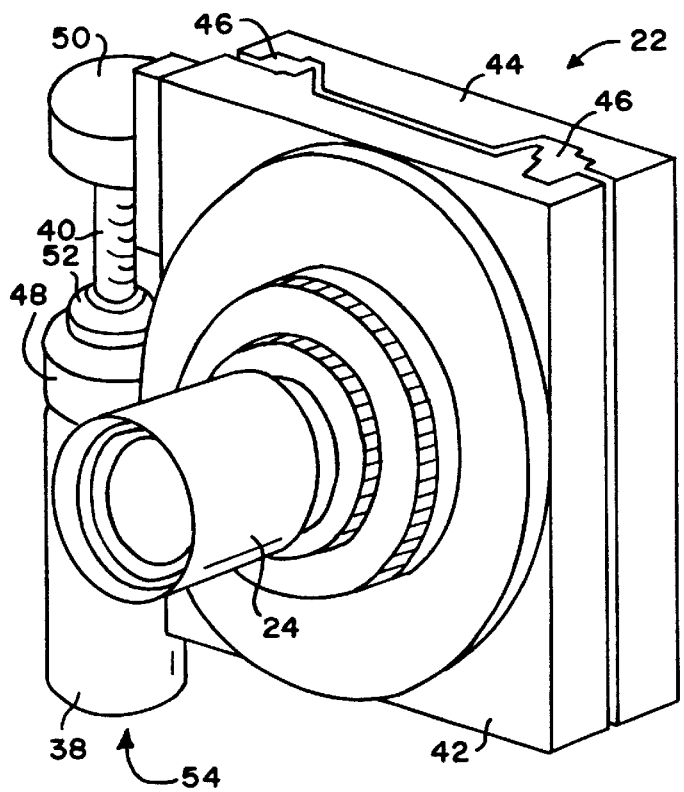
FIG. 14 is a front perspective view of the translation stage mounting means for all embodiments that provides reciprocating relative movement, within the focal plane of the image, of the spatial window with respect to the first objective lens.

Referring additionally to FIGS. 12–14, the operation of translation stage mounting means 22 can now be explained.

Translation stage mounting means 22 has a front portion 42 and a rear portion 44 mounted, as on well-known rails or guides 46, for sliding linear reciprocation of front portion 42 with respect to rear portion 44. First objective lens means 24 is fixedly secured, as by screws or the like, to the front portion 42 of translation stage mounting means 22. Servo motor 38, preferably a well-known servo motor such as the model 850F DC Actuator servo motor made by Newport Corporation, having an address of 1791 Deere Avenue, Irvine, Calif. 92606, is fixedly mounted to one of front or rear portions 42, 44, as by bracket 48, and the end of servo motor shaft 40 is secured to the other of front or rear portions 42, 44, as by bracket 50, for axial rotation and prevented from longitudinal movement with respect thereto. As threaded shaft 40 of servo motor 38 rotates within a threaded bushing 52 of servo motor 38, shaft 40 is thereby caused to extend or retract, depending on the direction of rotation, with respect to servo motor 38, thereby causing front and rear portions 42 and 44 to slidingly reciprocate with respect to each other under the control of interface logic board 36, which thus acts as position control means for the reciprocating movement of translation stage mounting means 22.

As hereinafter described, fixedly mounted to the rear portion 44 of translation stage mounting means 22 and within the focal plane of first objective lens means 24 is one of a variety of spatial window means, hereinafter described, for selectively passing one portion of the image in the focal plane.

Servo motor 38, thus mounted and structurally connected to translation stage mounting means 22 in the manner hereinbefore described, is seen to be motion means 54 for causing the reciprocation of rear portion 44 of translation stage mounting means 22 relative to first objective lens means 24. Because of the fixed mounting of the spatial window means within the focal plane of the first objective lens means 24, motion means 54 is thus seen to be for moving the spatial window means within the focal plane of the first objective lens means 24 and relative to the first objective lens means 24 as front objective means 24 and front portion 42 of translation stage mounting means 22 move relative to rear portion 44 of translation stage mounting means 22, such as, for example, from position 56 shown in solid outline in FIG. 1 to position 58 shown in dotted outline in FIG. 1.

Using a preferred servo motor 38 as hereinbefore described and having a shaft reciprocation speed of about 1 mm per second, the translation stage mounting means 22 takes about 13 seconds to traverse one stroke direction of reciprocation.

Focal plane scanner 20 is preferably mounted on a tripod 26 in proximity to a target T as shown in FIG. 1. If the translation stage mounting means 22 is mounted so that first objective lens 24 is fixed, the scanned image will have certain mathematical advantages because the first objective lens is stationary with respect to target, and the image will be a so-called "center projection image". If the translation stage mounting means 22 is mounted so that its rear portion 44 remains fixed, then front objective lens 24 will move slightly with respect to the target T and transversely to the optical path, and the image will be a so-called "multi-center projection image". As a practical matter, the very slight change in the image (and its mathematical description) that occurs, when the front objective lens 24 reciprocates upon the translation stage mounting means 22, is negligible for targets that are not immediately adjacent the front objective lens, and it has been found preferable to fixedly mount the rear portion 44 of translation stage mounting means 22 and allow the front objective lens 24 to move slightly relative to the target T because of the substantially greater weight and inertia of the CCD camera 28 and image relay/filter suite 60, hereinafter described, attached to the rear of the translation stage mounting means 22, as compared with the weight and inertia of the front objective lens 24, thereby requiring less torque from servo motor 38 to move the lesser weight and inertia of the front objective lens 24.

Referring especially to FIG. 2 and FIGS. 4–6, the first preferred embodiment 1.20 of the present invention can now be described. Identifying reference designators for all embodiments are marked similarly except for the prefix on reference designators, with the corresponding elements of the first embodiment 1.20 being identified using the prefix "1.". It shall be understood that many aspects of all embodiments are substantially the same, and only the differences will be treated in detail, it being understood that similar structural features of the various embodiments perform similar functions. Common elements, hereinbefore described for all embodiments, are given without a reference designator prefix.

Figure 2:
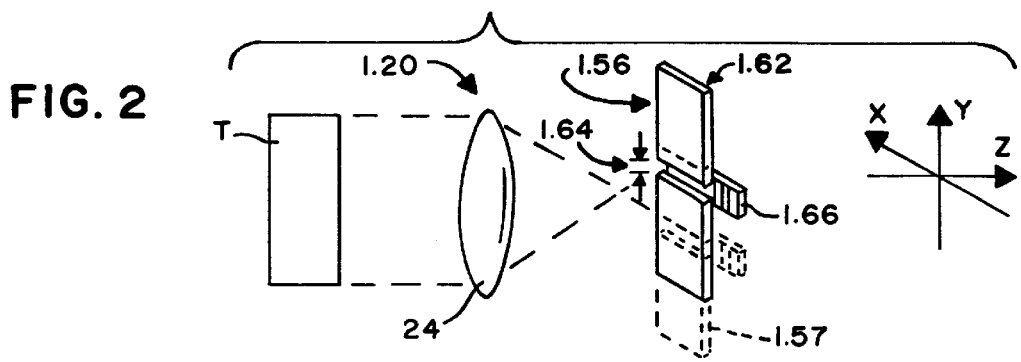
FIG. 2 is a diagram explaining the structure and operation of a first embodiment of the present invention.

The theory of the first preferred embodiment 1.20 is best understood by reference to FIG. 2. The image of the target T passes through first optical objective lens 24 and is focused onto spatial windowing means 1.62, mounted within the focal plane of first objective lens 24 and upon the rear portion of the translation stage hereinbefore described, for selectively passing a subset of row portions of the plurality of row portions of the image of target T formed within the focal plane. In the specific case of the first embodiment, the spatial windowing means 1.62 is a slit 1.64 that passes only a single row portion of the image of target T through the focal plane of first objective lens 24, and the passed subset of row portions thus contains only a single row portion of the image. Mounted in fixed relation with windowing means 1.62 and parallel to slit 1.64 is a well-known one-dimensional charge coupled device ("CCD") array 1.66 onto which the passed single row portion of the image is received, converted into an electronic charge representation of the image as received onto each of the cells of the CCD array, and then converted into an electrical signal representation of the image and passed to frame grabber means 32 via electrical video cable 30 (see FIG. 1) as hereinbefore described. Slit 1.64 preferably has a length of 16 mm and a height of 0.007 mm, and is aligned within the focal plane of the first objective lens 24 substantially parallel to the rows of the image of target T. As the slit 1.64 and CCD array 1.66 reciprocate together substantially perpendicular to the row portions of the image of target T and move relative to the first objective lens 24 from a position such as position 1.56 to a position such as position 1.57, slit 1.56 sweeps through the focal plane of the image of target T and successively selects sequential rows of the image for passage therethrough to CCD array 1.66, as illustrated in FIG. 6.

One-dimensional CCD array 1.66 is preferably a model IL-C5 CCD array having 2048 horizontal elements and made by Dalsa, Inc., having an address of 605 McMurray Road, Waterloo, Ontario, Canada N2V239. CCD array 1.66 preferably has a large number of linear CCD elements in the array because the number of those elements determines the horizontal resolution into which a particular image may be subdivided.

Figure 4:
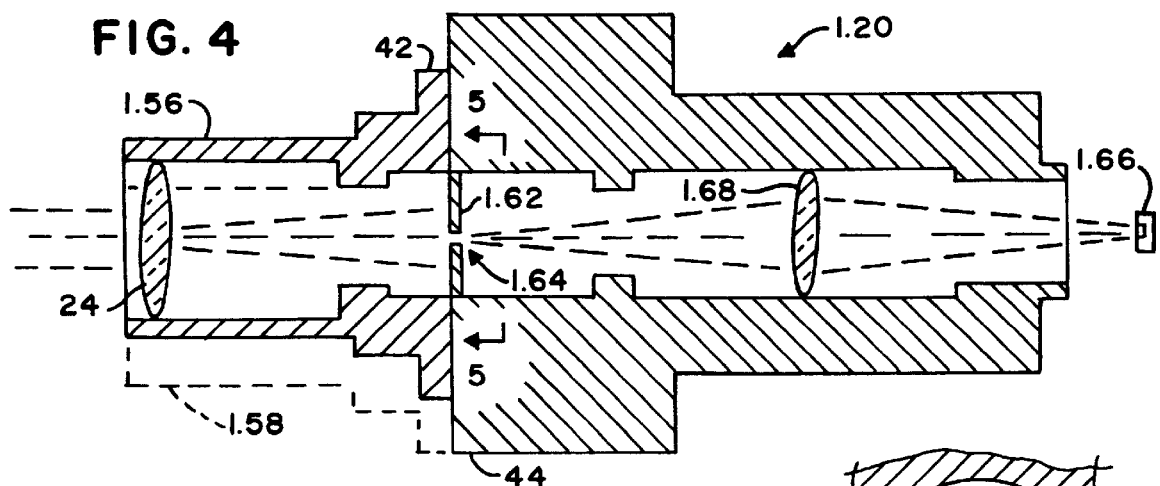
FIG. 4 is a side sectional view showing the structure of the first embodiment of the present invention and taken substantially along the midsection of the first embodiment.
Figure 5:
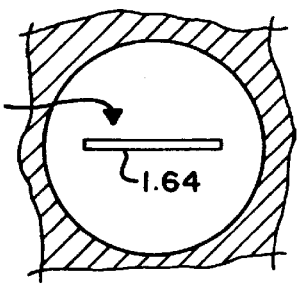
FIG. 5 is a transverse sectional view of the first embodiment of the present invention showing the slit within the focal plane of the image, taken substantially along the line 5—5 shown in FIG. 4.
Figure 6:
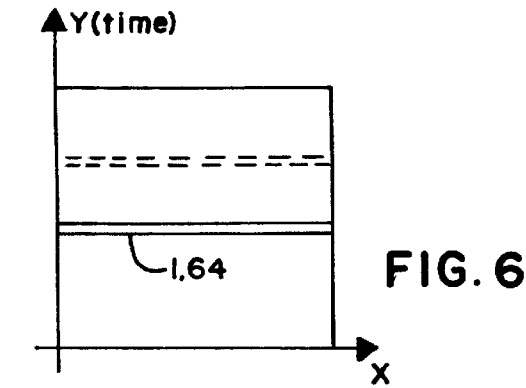
FIG. 6 is a graph showing the relative movement of the slit of the first embodiment within the focal plane of the image.

Referring now to FIGS. 4–6, the structure of the first embodiment 1.20 can now be explained in further detail.

Front objective lens 24 reciprocates, as from position 1.56 to position 1.58, relatively with respect to slit 1.64 and CCD array 1.66 as the servo motor, under control of the computer and its position control means, moves the front portion 42 of the translation stage with respect to the rear portion 44 of the translation stage. Interposed between slit 1.64 and CCD array 1.66 is optical image relay means 1.68 for relaying the passed single row portion of the image to the CCD array 1.66.

Image relay lens assemblies such as optical image relay means 1.68 are well-known to those skilled in the art, and take an image from one optical system and make that image available to another optical system, thereby transferring an image from one focal plane to another. In the first embodiment of the present invention, the image relay lens 1.68 is used to optically mate the image-receiving surface of the one-dimensional CCD array 1.66 with the focal plane of the front objective lens means 24. A preferred image relay lens for use as optical image relay means 1.68 of the first embodiment of the present invention is the model Apo-Artar 4.0/75 mm image relay lens, part number 35-039154, made by Schneider Optics, Inc., having an address of 285 Oser Avenue, Hauppauge, N.Y. 11788. A well-known optical fiber bundle ("fiber optics") could also and equivalently be used for the image relay means 1.68 to transfer the image from the focal plane of the first objective lens 24 to the CCD array 1.66, and it is important to understand that the critical function performed by image relay means 1.68 is to optically mate the focal plane of the first objective lens 24 to the CCD array 1.66. A disadvantage of using optical fiber bundles for image relay means 1.68 is the transmission loss present with currently-available optical fiber bundles, but those transmission losses are seen to be decreasing as improvements are made in fiber optic technology.

As the slit 1.64, image relay lens 1.68, and CCD array 1.66 move relative to the front objective lens 24, a monochromatic version of the image is thus scanned by the CCD array and captured by the frame grabber means in electrical communication therewith within the computer.

Figure 3:
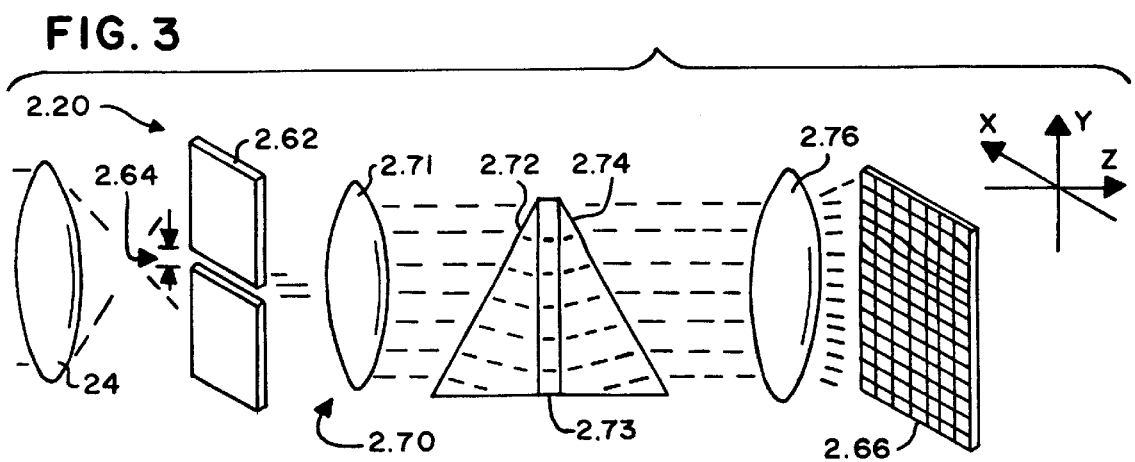
FIG. 3 is a diagram explaining the structure and operation of a second embodiment of the present invention.
Figure 7:
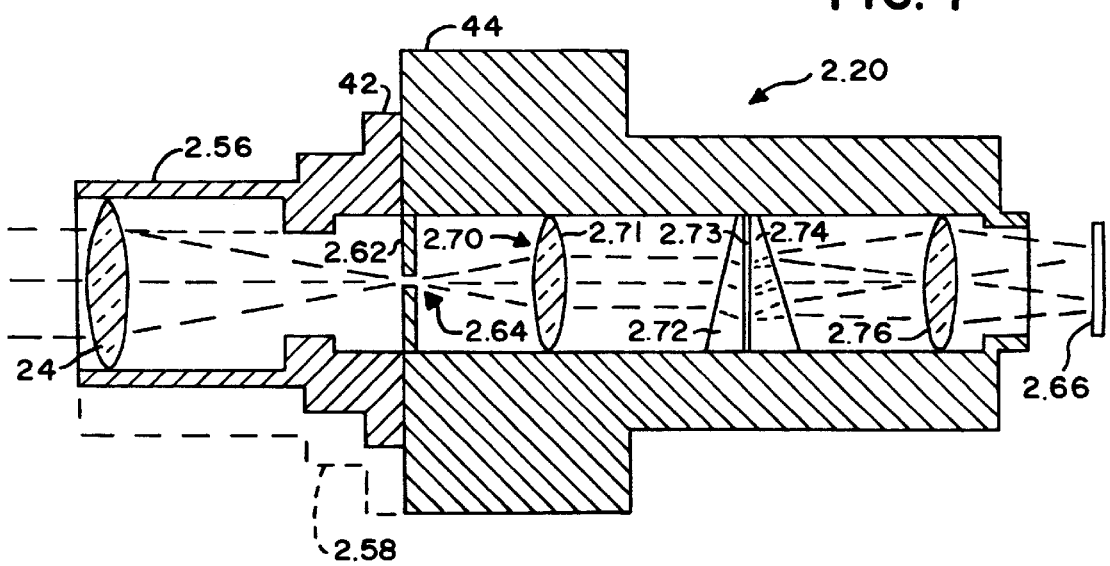
FIG. 7 is a side sectional view showing the structure of the second embodiment of the present invention and taken substantially along the midsection of the second embodiment
Figure 8:
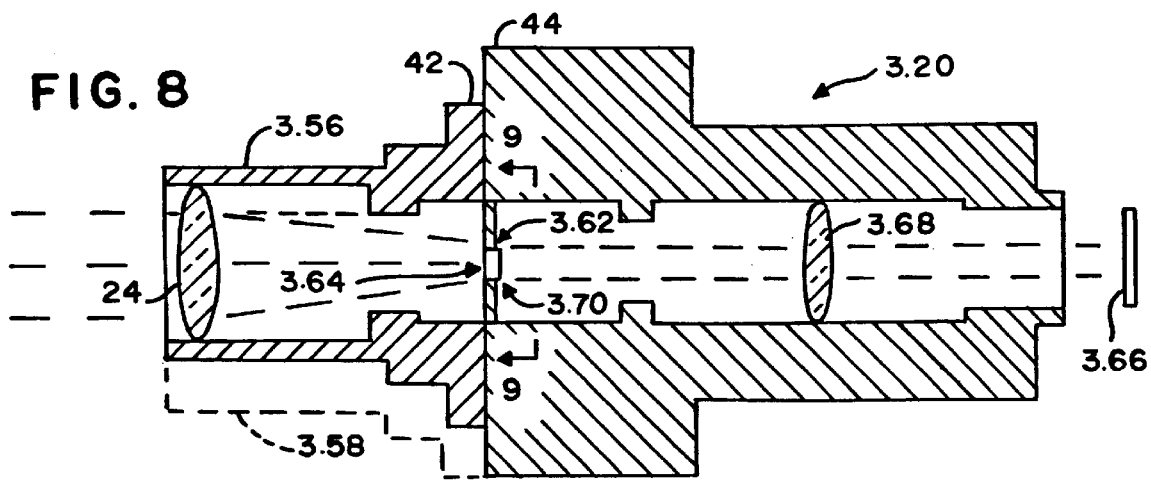
FIG. 8 is a side sectional view showing the structure of the third embodiment of the present invention and taken substantially along the midsection of the third embodiment.
Figure 15:
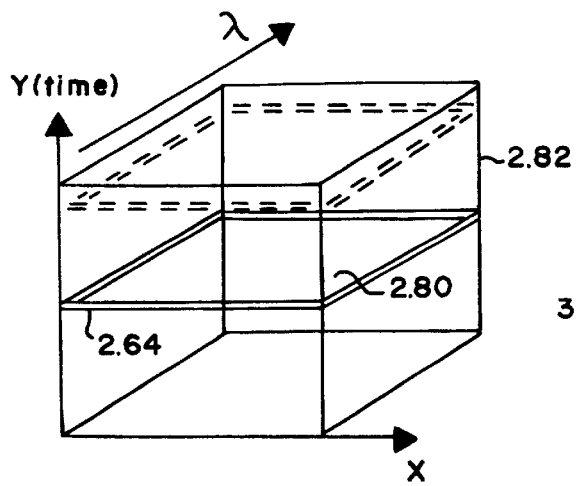
FIG. 15 is a three-dimensional graph showing the hyperspectral scanned image as a unction of time by the second embodiment of the present invention.

Referring especially to FIGS. 3, 7, and 15, the second preferred embodiment 2.20 of the present invention can now be described. Identifying reference designators for all embodiments are marked similarly except for the prefix on reference designators, with the corresponding elements of the second embodiment being identified using the prefix "2.". It shall be understood that many aspects of all embodiments are substantially the same, and only the differences will be treated in detail, it being understood that similar structural features of the various embodiments perform similar functions. Common elements, hereinbefore described for all embodiments, are given without a reference designator prefix.

The theory and structure of the second preferred embodiment 2.20 is best understood by reference to FIGS. 3 and 7. The image of the target passes through first optical objective lens 24 and is focused onto spatial windowing means 2.62, mounted within the focal plane of first objective lens 24 and upon the rear portion of the translation stage hereinbefore described, for selectively passing a subset of row portions of the plurality of row portions of the image of the target formed within the focal plane. In the specific case of the second embodiment, the spatial windowing means 2.62 is a slit 2.64, substantially similar to slit 1.64 of the first embodiment, that passes only a single row portion of the image of the target through the focal plane of first objective lens 24, and the passed subset of row portions thus contains only a single row portion of the image, as was the case with the first embodiment. Mounted in fixed relation with windowing means 2.62 and parallel to slit 2.64 is a well-known two-dimensional charge coupled device ("CCD") array 2.66 onto which the passed single row portion of the image is received, converted into an electronic charge representation of the image as received onto each of the cells of the CCD array, and then converted into an electrical signal representation of the image and passed to frame grabber means 32 via electrical video cable 30 (see FIG. 1) as hereinbefore described. Slit 2.64 preferably has a length of 11 mm and a height of 0.025 mm, and is aligned within the focal plane of the first objective lens 24 substantially parallel to the rows of the image of the target. As the slit 2.64 and CCD array 2.66 reciprocate together substantially perpendicular to the row portions of the image of the target and move relative to the first objective lens 24, slit 2.56 sweeps through the focal plane of the image of the target and successively selects sequential rows of the image for passage therethrough to CCD array 2.66, as illustrated in FIG. 15.

Front objective lens 24 reciprocates, as from position 2.56 to position 2.58, relatively with respect to slit 2.64 and CCD array 2.66 as the servo motor, under control of the computer and its position control means, moves the front portion 42 of the translation stage with respect to the rear portion 44 of the translation stage. Interposed between slit 2.64 and CCD array 2.66 is spectrum separation means 2.70 for spreadedly separating the single row of the image passed through slit 2.64 into a spectrum of the image that is received onto the CCD array 2.66. Preferably, spectrum separation means 2.70 is a well-known prism-grating-prism ("PGP") optical spectrometer comprising, in sequential order as the image passes therethrough, a collimating lens 2.71, a first prism 2.72, a diffraction grating 2.73, a second prism 2.74, and a focusing lens 2.76. Diffraction grating 2.73 is preferably a well-known holographic diffraction grating. Spectrum separation means 2.70 is preferably a model V9C prism-grating-prism optical spectrometer made by Spectral Imaging, Ltd., having an address of Kaitovayla 1, P.O. Box 110 FIN-90571 OULU, Finland. The prism-grating-prism optical spectrometer 2.70, in a manner well-known to those skilled in the art, spreads the spectrum of a passed image in the vertical ("y") direction (using the orientation shown) so that the spectral lines for a given horizontal point on the row portion that passes through slit 2.66 will fall upon separate rows within the respective column for that point on the CCD array 2.66. A maximum number of hyperspectral image bands of the scanned image is decided by the number of vertical rows of the CCD array 2.66 chosen, because, as just described, for each point in the image, each image band falls onto a different row of the CCD within the vertical column for that point.

Two-dimensional CCD array 2.66 is preferably a model SensiCam VGA CCD array having 640 horizontal elements and 480 vertical elements and made by The Cooke Corporation, having an address of 600 Main St., P.O. Box 888, Tonawanda, N.Y. 14150-0888. CCD array 2.66 preferably has a large number of horizontal CCD elements in the array because the number of those elements determines the horizontal resolution into which a particular image may be subdivided. At any instant, the symbolic hyperspectral plane representing the separated spectrum for a particular passed horizontal row of the image is represented by the plane 2.80 shown in FIG. 15.

As the slit 2.64, PGP spectrum separation means 2.70, and CCD array 2.66 move relative to the front objective lens 24, a hyperspectral version of the image is thus scanned by the CCD array, as shown symbolically by the hyperspectral cube 2.82 shown in FIG. 15, and is captured by the frame grabber means that is within the computer and in electrical communication with the CCD array 2.66.

Referring especially to FIGS. 8–11 and 16, the theory and structure of the third preferred embodiment 3.20 of the present invention can now be described. Identifying reference designators for all embodiments are marked similarly except for the prefix on reference designators, with the corresponding elements of the third embodiment 3.20 being identified using the prefix "3.". It shall be understood that many aspects of all embodiments are substantially the same, and only the differences will be treated in detail, it being understood that similar structural features of the various embodiments perform similar functions. Common elements, hereinbefore described for all embodiments, are given without a reference designator prefix.

Figure 16:
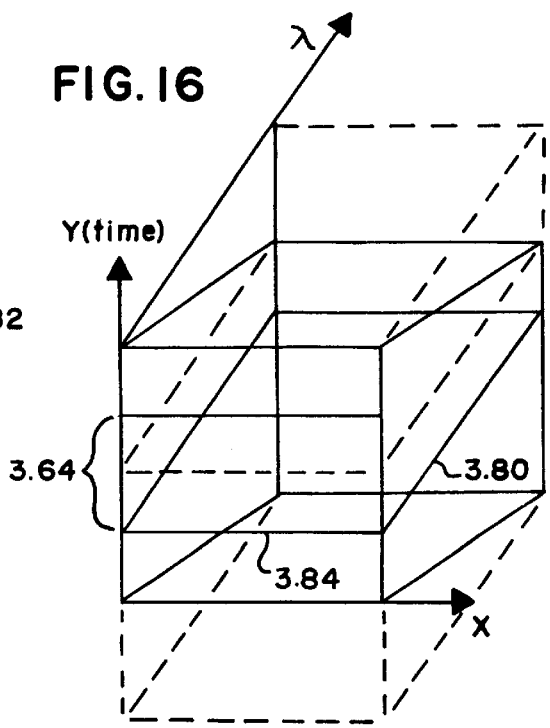
FIG. 16 is a three-dimensional graph showing the hyperspectral scanned image as a function of time by the third embodiment of the present invention.

The image of the target passes through first optical objective lens 24 and is focused onto spatial windowing means 3.62, mounted within the focal plane of first objective lens 24 and upon the rear portion of the translation stage hereinbefore described, for selectively passing a subset of row portions of the plurality of row portions of the image of the target formed within the focal plane. In the specific case of the third embodiment 3.20, the spatial windowing means 3.62 is a rectangular aperture 3.64 that passes multiple row portions of the image of the target through the focal plane of first objective lens 24. Mounted in fixed relation with windowing means 3.62 and in rectangular alignment with rectangular aperture 3.64 is a well-known two-dimensional charge coupled device ("CCD") array 3.66 onto which a bandpass-filtered version of the passed rows of the image is received, converted into an electronic charge representation of the image as received onto each of the cells of the CCD array, and then converted into an electrical signal representation of the image and passed to frame grabber means 32 via electrical video cable 30 (see FIG. 1) as hereinbefore described. As the rectangular aperture 3.64 and CCD array 3.66 reciprocate together substantially perpendicular to the row portions of the image of the target and move relative to the first objective lens 24, rectangular aperture 3.56 sweeps through the focal plane of the image of the target and successively selects multiple sequential rows of the image for passage therethrough to CCD array 3.66, as illustrated in FIG. 16.

Figure 10:
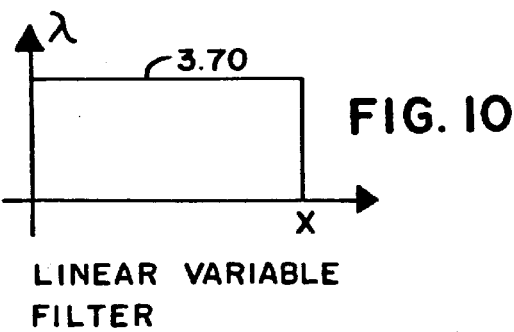
FIG. 10 is graph explaining the structure of the linear variable filter of the third embodiment of the present invention.
Figure 9:
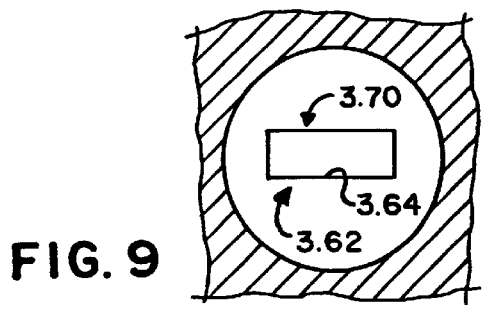
FIG. 9 is a transverse sectional view of the third embodiment of the present invention showing the linear variable filter's rectangular window within the focal plane of the image, taken substantially along the line 9—9 shown in FIG. 8.
Figure 11:
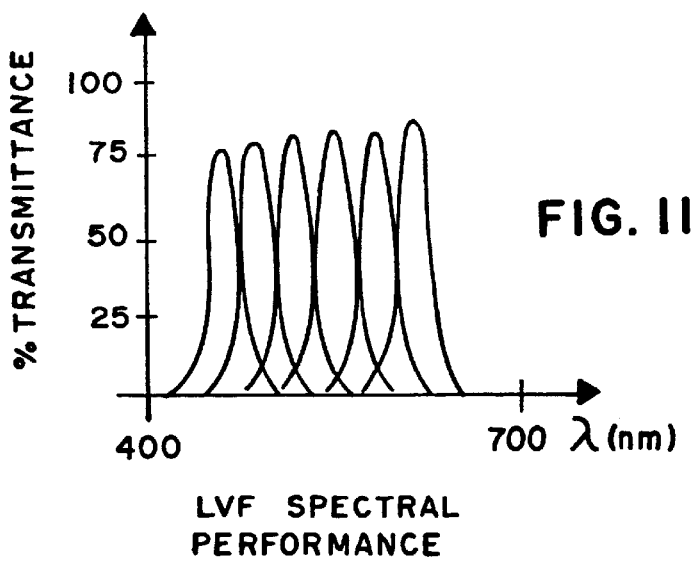
FIG. 11 is a graph explaining the spectral transmittance performance of the linear variable filter of the third embodiment of the present invention.

Preferably integral with windowing means 3.62 is spectrum filtering means 3.70, preferably a we-known linear variable filter ("LVF") such as one of those sold under the trademark SELECTRABAND and made by Optical Coating Laboratory, Inc. ("OCLI"), 2789 Northpoint Parkway, Santa Rosa, Calif. 95407-7397. Such linear variable filters are rectangular interference filters performing both a rectangular windowing function and a spectrum filtering function, and consist of all-dielectric coating materials that have been vacuum deposited onto rectangular substrates. Such filters offer continuous spectral coverage within a predetermined portion of the visible wavelength region and have a linear-variable bandpass along one dimension (the "λ" dimension) and have a fixed bandpass along the other ("x") dimension. FIG. 11 shows the percentage transmittance of the filter within various wavelength bands as a function of wavelength ("λ") along one axis of the filter, and, as shown in FIG. 10, the filter is oriented in the third embodiment so that the wavelength transmittance varies along the vertical direction, i.e., the same direction as the direction of reciprocation of the translation stage, so that, for example, the longer wavelengths of the image are passed by a strip along the top of the filter's rectangle and so that the shorter wavelengths of the image are passed by another strip along the bottom of the filter's rectangle. Because the dielectric coating is overlapped upon a rectangular clear aperture, the linear variable filter means 3.70 performs not only a spatial windowing operation, passing only a multiple row subset from the plurality of row portions of the image, but also performs a spectrum filtering operation upon the rectangularly-windowed multiple row portion of the image.

The design theory of the well-known linear variable filter 3.70 is based on the phenomenon that as the dielectric coating thickness varies along the length of the filter's λ axis, so does the transmitted wavelength. The correlation between coating thickness is very repeatable, so wavelength calibration can be simplified. The preferred linear variable filters are physically durable and withstand the rigors of industrial and military environments. They are resistant to abrasion and humidity, and can be cleaned by conventional optical cleaning techniques. In addition, these linear variable filters are capable of being operated at temperatures as low as 4° Kelvin.

The various linear variable filters offered under the trademark SELECTRABAND by OCLI differ primarily in their spanned wavelength coverage and in their relative transmittance, with all of these filters having their dielectric coatings deposited on glass substrates. The model LVF400-700 and LVF400-700NB linear variable filters offer continuous wavelength coverage from 400 to 700 nm, have a half-bandwidth that is 2.5% or less of the center wavelength, have a linearity of ±2 nm, have an out-of-bandwidth blocking specification of 0.1% or less from 400 to 700 nm and less than 0.1% below 400 nm, and have an aperture window that is approximately 5.0 mm by 10.0 mm. The LVF400-700 linear variable filter has transmittance of 45% or greater within the wavelengths specified and offers superior near-infrared blocking, having a near infrared blocking specification of 0.01% or less (average) from 750 to 1200 nm. The LVF400-700NB linear variable filter has spectral characteristics similar to the LVF400-700 linear variable filter except that the LVF400-700NB has 60% or greater peak transmittance and has no near-infrared blocking.

The model LVF600-1100 and LVF600-1100NB linear variable filters are similar but offer continuous wavelength coverage from 600 to 1100 nm, have a half-bandwidth that is 2.0% or less of the center wavelength, have a linearity of ±4 nm, have an out-of-bandwidth blocking specification of 0.1% or less from 600 to 1100 nm and less than 0.1% above 1100 to 1150 nm, and have an aperture window that is approximately 5.0 mm by 12.5 mm. The LVF600-1100 linear variable filter has transmittance of 45% or greater within the wavelengths specified and offers near-ultraviolet blocking, having a near ultraviolet blocking specification of 0.01% or less (average) from 350 to 550 nm. The LVF600-1100NB linear variable filter has spectral characteristics similar to the LVF600-1100 linear variable filter except that the LVF600-1100NB has 60% or greater peak transmittance and has no short wavelength blocking.

The model LVF650-1050 and LVF650-1050NB linear variable filters are modified versions of the model LVF600-1100 and LVF600-1100NB linear variable filters except that the LVF650-1050 and LVF650-1050NB linear variable filters offer continuous wavelength coverage from 650 to 1050 nm.

The appropriate linear variable filter should be selected depending on the spectral information desired from the scanned image. While the third embodiment of the present invention, using a linear variable filter, does not have as high of a spectral resolution as the second embodiment of the present invention using the prism-grating-prism ("PGP") optical spectrometer, the third embodiment with the linear variable filter has been found to have higher transmittance, thereby enabling images to be scanned in lower light level situations on relatively darker images.

Front objective lens 24 reciprocates, as from position 3.56 to position 3.58, relatively with respect to rectangular window 3.64 and CCD array 3.66 as the servo motor, under control of the computer and its position control means, moves the front portion 42 of the translation stage with respect to the rear portion 44 of the translation stage. Interposed between rectangular window 3.64 and CCD array 3.66 is optical image relay means 3.68 for relaying the passed bandpass-filtered multiple rows of the windowed portion of the image to the CCD array 3.66.

Optical image relay lens 3.68 of the third embodiment serves a similar function as the image relay lens 1.68 of the first embodiment 1.20 hereinbefore described. In the third embodiment 3.20 of the present invention, the image relay lens 3.68 is used to optically mate the image-receiving surface of the two-dimensional CCD array 3.66 with the focal plane of the front objective lens means 24, transferring the windowed image passed by the linear variable filter 3.70 to the two-dimensional CCD array 3.66. A preferred image relay lens for use as optical image relay means 3.68 of the third embodiment 3.20 of the present invention is the model Apo-Artar 4.0/75 mm image relay lens, part number 35-039154, made by Schneider Optics, Inc., having an address of 285 Oser Avenue, Hauppauge, N.Y. 11788. A well-known optical fiber bundle ("fiber optics") could also and equivalently be used for the image relay means 3.68 to transfer the image from the focal plane of the first objective lens 24 to the two-dimensional CCD array 3.66, and it is important to understand that the critical function performed by image relay means 3.68 is to optically mate the focal plane of the first objective lens 24 to the plane of the two-dimensional CCD array 3.66. A disadvantage of using optical fiber bundles for image relay means 3.68 is the transmission loss present with currently-available optical fiber bundles, but those transmission losses are seen to be decreasing as improvements are made in fiber optic technology. However, a significant advantage of using optical fiber bundles for image relay means 3.68 is that, by spreading the optical fibers in the bundle as the fibers approach two-dimensional CCD array 3.66, the transmitted image can thus be "stretched" in one or both spatial dimensions of the CCD array 3.66 so as to match the LVP to the resolution of two-dimensional CCD array 3.66. For example, a CCD array having twice the number of rows could be used to give twice the frequency resolution in the "y" direction as compared to a smaller CCD array, but the height of the CCD array might not match the height of the LVF. By stretching the image in the vertical ("y") direction by spreading the optical fibers as they matingly approach the CCD array, the image passed by the LVF would be spread onto the available rows of the two-dimensional CCD array. Likewise, if greater horizontal resolution is desired, the optical fibers would be spread in the horizontal ("x") direction onto a wider CCD array having columns into which the image would be partitioned horizontally. Thus, the aspect ratio of the image can be changed to mate the LVF's dimensions with the CCD's dimensions, as required.

Two-dimensional CCD array 3.66 is preferably a model SensiCam VGA CCD array having 640 horizontal elements and 480 vertical elements and made by The Cooke Corporation, having an address of 600 Main St., P.O. Box 888, Tonawanda, N.Y. 14150-0888. CCD array 3.66 preferably has a large number of horizontal CCD elements in the array because the number of those elements determines the horizontal resolution into which a particular image may be subdivided. The symbolic hyperspectral plane representing the separated spectrum for a particular passed horizontal row 3.84 of the image is represented by the plane 3.80 within the hyperspectral cubic diamond shown in FIG. 16. A maximum number of hyperspectral image bands of the scanned image is decided by the number of vertical rows of the CCD array 3.66 chosen, because, as just described, for each windowed portion of the image, successive spectral image bands for successive windowed rows of the image fall onto a different successive rows of the CCD.

As the rectangular window 3.64 and linear variable filter 3.70, image relay lens 3.68, and CCD array 3.66 move relative to the front objective lens 24, a hyperspectral version of the image is thus scanned by the CCD array, as shown symbolically by the hyperspectral cubic diamond shown in FIG. 16, and is captured by the frame grabber means that is within the computer and in electrical communication with the CCD array 3.66. Because the LVF has its linear-variable bandpass function varying along the height ("λ" dimension) of its rectangular aperture 3.62, it is necessary for the reciprocation of the translation stage mounting means to overtravel the image by a distance equal to the height of the LVF so that the LVF fully sweeps past the entire image. This overtravel results in excess image data at the beginning and end of the translation stage's reciprocation because, at the extremes of the reciprocation, a portion of the LVF is outside the top and bottom boundaries of the image of the target. For example, when the top of the LVF is aligned with the bottom of the image in the focal plane, the lower portions of the LVF are outside (below) the image of the target in the focal plane. Likewise, because successive varying wavelength filtering for a given row of the image occurs as the LVF sweeps by that given row of the image as time passes, the various spectral band portions of a given row are received by the CCD array 3.66 as time passes, rather than all spectral band portions being received at the same instant by the CCD 2.66 of the second embodiment. For this reason, the hyperspectral plane 3.80 in FIG. 16 is shown at an angle because of the time sequence involved in its reception by the CCD.

To use all embodiments of the present invention, as shown in FIG. 1, a target T is placed in the viewing range of front objective lens 24. As the servo motor 38, under control of position control means 36, causes the translation stage to reciprocate, in a manner hereinbefore described, the electrical signal representing the scanned image passes along cable 30 to frame grabber means 32, where the image is captured and stored for further viewing and/or processing.

Although the present invention has been described and illustrated with respect to preferred embodiments and a preferred use therefor, it is not to be so limited since modifications and changes can be made therein which are within the full intended scope of the invention.

I claim:

1. A focal plane scanner for viewing an image of a target, said scanner comprising:

(a) first optical objective lens means for focusing said image in a focal plane of said first optical objective lens means, said focal plane having formed therewithin a plurality of substantially parallel row portions of said image;

(b) spatial window means for selectively passing a subset of row portions of said plurality of row portions of said image through said focal plane and for selectively blocking all those row portions of said plurality of row portions that are not within said passed subset at a given moment from passing through said focal plane; said spatial window means being mounted for reciprocating translational movement within said focal plane, relative to said first objective lens means, in a direction substantially perpendicular to said plurality of row portions of said image;

(c) motion means for moving said spatial window means within said focal plane, relative to said first objective lens means, in said direction substantially perpendicular to said plurality of row portions of said image; and (d) image sampling array means for receiving said passed subset of row portions of said image and for converting said passed subset of row portions of said image into an electronic charge representation of said image, said image sampling array means being mounted in fixed relation with respect to said spatial window means.

2. The focal plane scanner as recited in claim 1, in which said passed subset of row portions contains only a single row portion of said plurality of row portions of said image and said spatial window means is a slit selectively passing only said single row portion of said plurality of row portions of said image.

3. The focal plane scanner as recited in claim 2, in which said image sampling array means is a one-dimensional charge coupled device array onto which said passed single row portion of said plurality of row portions is received.

4. The focal plane scanner as recited in claim 3, in which said scanner includes optical image relay means, interposed between said one-dimensional charge coupled device array and said slit, for relaying said passed single row portion of said image to said one-dimensional charge coupled device array.

5. The focal plane scanner as recited in claim 2, in which said image sampling array means is a two-dimensional charge coupled device array and said scanner includes spectrum separation means, interposed between said slit and said two-dimensional charge coupled device array, for spreadedly separating said passed single row portion of said image into a spectrum of said image received onto said two-dimensional charge coupled device array.

6. The focal plane scanner as recited in claim 5, in which said spectrum separation means is an optical spectrometer, said optical spectrometer comprising, in sequential order as said image passes therethrough:

(a) a collimating lens;
(b) a first prism;
(c) a diffraction grating;
(d) a second prism; and
(e) a focusing lens.

7. The focal plane scanner as recited in claim 1, in which said passed subset of row portions includes multiple row portions from said plurality of row portions of said image and said spatial window means includes a linear variable filter selectively passing only said multiple row portions from said plurality of row portions, said linear variable filter having a linear-variable bandpass along said direction substantially perpendicular to said plurality of row portions of said image.

8. The focal plane scanner as recited in claim 7, in which said image sampling array means is a two-dimensional charge coupled device array onto which said passed multiple row portions are received after having been bandpass-filtered by said linear variable filter.

9. The focal plane scanner as recited in claim 8, in which said scanner includes optical image relay means, interposed between said two-dimensional charge coupled device array and said spatial window means, for relaying said passed multiple row portions of said image to said two-dimensional charge coupled device array after said passed multiple row portions have been bandpass-filtered by said linear variable filter.

10. A focal plane scanner for viewing an image of a target, said scanner comprising:
   (a) first optical objective lens means for focusing said image in a focal plane of said first optical objective lens means, said focal plane having formed therewithin a plurality of substantially parallel row portions of said image;
   (b) spatial window means for selectively passing a single row portion of said plurality of row portions of said image through said focal plane and for selectively blocking all those row portions of said plurality of row portions that are not within said passed single row portion of said plurality of row portions of said image at a given moment from passing through said focal plane; said spatial window means being a slit mounted for reciprocating movement within said focal plane, relative to said first objective lens means, in a direction substantially perpendicular to said plurality of row portions of said image;
   (c) translation stage mounting means for reciprocatingly moving said spatial window means within said focal plane, relative to said first objective lens means, in said direction substantially perpendicular to said plurality of row portions of said image, said translation stage mounting means comprising:
      i. a front portion having said first optical objective lens mounted in fixed relation thereto;
      ii. a rear potion having said spatial window means mounted in fixed relation thereto;
      iii. reciprocation mounting means mounting said front portion for reciprocating movement, relative to said rear portion, in said direction substantially perpendicular to said plurality of row portions of said image; and
      iv. motor means for reciprocatingly moving said front portion relative to said rear portion;
   (d) image sampling array means for receiving said passed single row portion of said image and for converting said passed single row portion of said image into an electrical signal representation of said image, said image sampling array means being mounted in fixed relation with respect to said spatial window means, said image sampling array means comprising a one-dimensional charge coupled device array onto which said passed single row portion is received; and
   (e) optical image relay means, interposed between said one-dimensional charge coupled device array and said spatial window means, for relaying said passed single row portion of said image to said one-dimensional charge coupled device array.

11. The focal plane scanner as recited in claim 10, additionally comprising:
   (a) frame grabber means for receiving said electrical signal representation of said image and storing said electrical signal representation into a memory; and
   (b) computer means for controlling said motor means.

12. A focal plane scanner for viewing an image of a target, said scanner comprising:
   (a) first optical objective lens means for focusing said image in a focal plane of said first optical objective lens means, said focal plane having formed therewithin a plurality of substantially parallel row portions of said image;
   (b) spatial window means for selectively passing a single row portion of said plurality of row portions of said image through said focal plane and for selectively blocking all those row portions of said plurality of row portions that are not within said passed single row portion of said plurality of row portions of said image at a given moment from passing through said focal plane; said spatial window means being a slit mounted for reciprocating movement within said focal plane, relative to said first objective lens means, in a direction substantially perpendicular to said plurality of row portions of said image;
   (c) translation stage mounting means for reciprocatingly moving said spatial window means within said focal plane, relative to said first objective lens means, in said direction substantially perpendicular to said plurality of row portions of said image, said translation stage mounting means comprising:
      i. a front portion having said first optical objective lens mounted in fixed relation thereto;
      ii. a rear potion having said spatial window means mounted in fixed relation thereto;
      iii. reciprocation mounting means mounting said front portion for reciprocating movement, relative to said rear portion, in said direction substantially perpendicular to said plurality of row portions of said image; and
      iv. motor means for reciprocatingly moving said front portion relative to said rear portion;
   (d) spectrum separation means for spreadedly separating said passed single row portion of said image into a spectrum of said image; said spectrum separation means being an optical spectrometer comprising, in sequential order as said image passes therethrough:
      i. a collimating lens;
      ii. a first prism;
      iii. a diffraction grating;
      iv. a second prism; and
      v. a focusing lens;
   and,
   (e) image sampling array means for receiving said spectrum of said image and for converting said spectrum of said image into an electrical signal representation of said spectrum of said image, said image sampling array means being mounted in fixed relation with respect to said spatial window means; said image sampling array means comprising a two-dimensional charge coupled device array onto which said spectrum of said image is received; said spectrum separation means being interposed between said slit and said two-dimensional charge coupled device array.

13. The focal plane scanner as recited in claim 12, additionally comprising:
   (a) frame grabber means for receiving said electrical signal representation of said image and storing said electrical signal representation into a memory; and
   (b) computer means for controlling said motor means.

14. A focal plane scanner for viewing an image of a target, said scanner comprising:
   (a) first optical objective lens means for focusing said image in a focal plane of said first optical objective lens means, said focal plane having formed therewithin a plurality of substantially parallel row portions of said image;
   (b) spatial window means for selectively passing a subset of row portions of said plurality of row portions of said image through said focal plane and for selectively blocking all those row portions of said plurality of row portions that are not within said passed subset at a given moment from passing through said focal plane; said passed subset of row portions including multiple row portions from said plurality of row portions of said image; said spatial window means including a linear variable filter selectively passing only said multiple row portions from said plurality of row portions; said linear variable filter having a linear-variable bandpass along a direction substantially perpendicular to said plurality of row portions of said image and said linear variable filter being mounted for reciprocating movement within said focal plane, relative to said first objective lens means, in said direction substantially perpendicular to said plurality of row portions of said image;
   (c) translation stage mounting means for reciprocatingly moving said spatial window means within said focal plane, relative to said first objective lens means, in said direction substantially perpendicular to said plurality of row portions of said image, said translation stage mounting means comprising:
      i. a front portion having said first optical objective lens mounted in fixed relation thereto;
      ii. a rear potion having said spatial window means mounted in fixed relation thereto;
      iii. reciprocation mounting means mounting said front portion for reciprocating movement, relative to said rear portion, in said direction substantially perpendicular to said plurality of row portions of said image; and
      iv. motor means for reciprocatingly moving said front portion relative to said rear portion;
   (d) image sampling array means for receiving said passed multiple row portions of said image and for converting said passed multiple row portions of said image into an electrical signal representation of said image, said image sampling array means being mounted in fixed relation with respect to said spatial window means, said image sampling array means comprising a two-dimensional charge coupled device array onto which said passed multiple row portions of said image are received; and
   (e) optical image relay means, interposed between said two-dimensional charge coupled device array and said spatial window means, for relaying said passed multiple row portions of said image to said two-dimensional charge coupled device array.

15. The focal plane scanner as recited in claim 14, additionally comprising:
   (a) frame grabber means for receiving said electrical signal representation of said image and storing said electrical signal representation into a memory; and
   (b) computer means for controlling said motor means.

* * * * *